June 26, 1956  G. B. DOREY  2,751,862
HOPPER DISCHARGE OUTLET STRUCTURE AND SEALING MEANS THEREFOR
Filed May 1, 1953  5 Sheets-Sheet 2

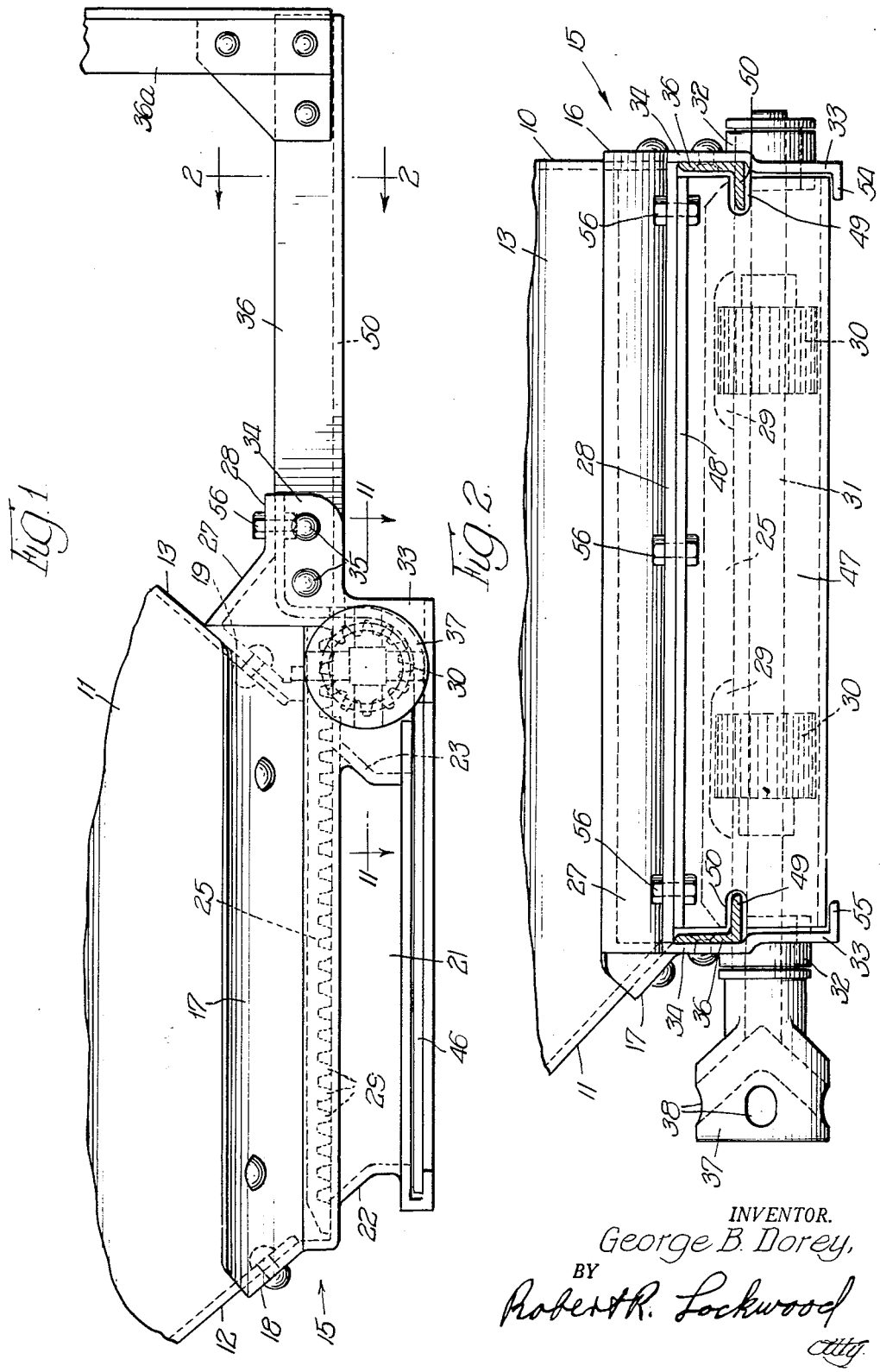

INVENTOR.
George B. Dorey,
BY
Robert R. Lockwood
ATTY.

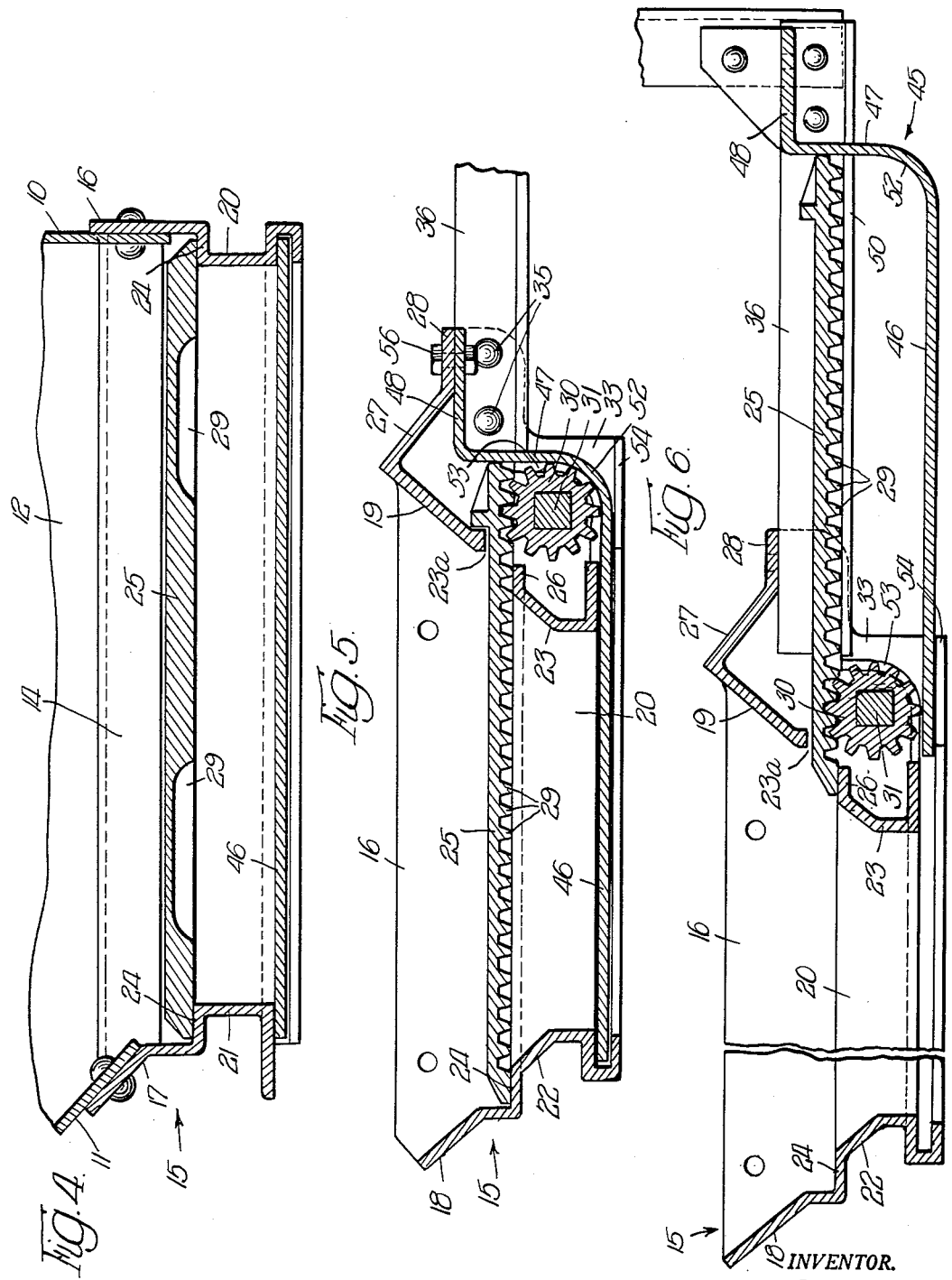

June 26, 1956  G. B. DOREY  2,751,862
HOPPER DISCHARGE OUTLET STRUCTURE AND SEALING MEANS THEREFOR
Filed May 1, 1953  5 Sheets-Sheet 4
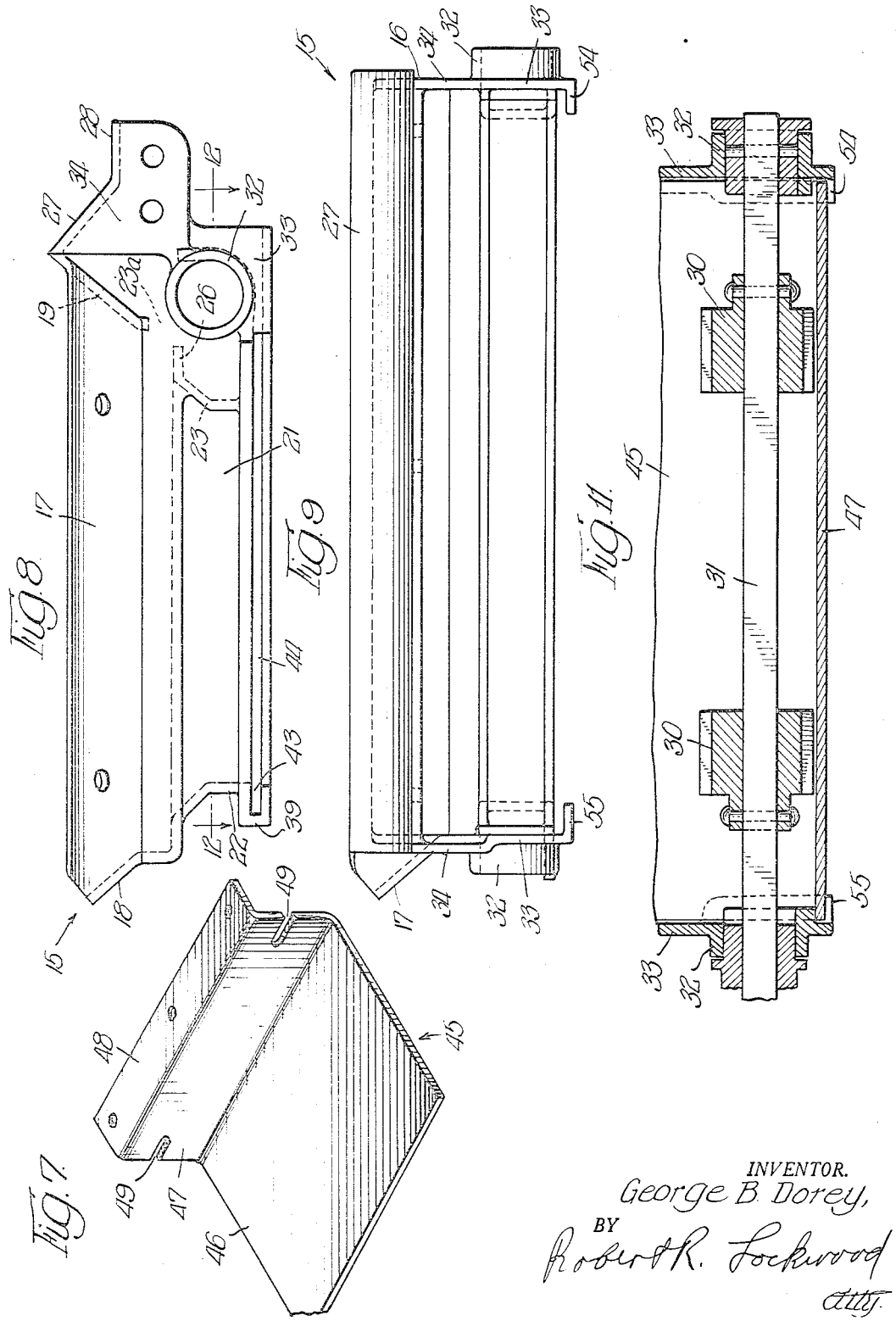
INVENTOR.
George B. Dorey,
BY Robert R. Lockwood
ATTY.

June 26, 1956  G. B. DOREY  2,751,862
HOPPER DISCHARGE OUTLET STRUCTURE AND SEALING MEANS THEREFOR
Filed May 1, 1953  5 Sheets-Sheet 5
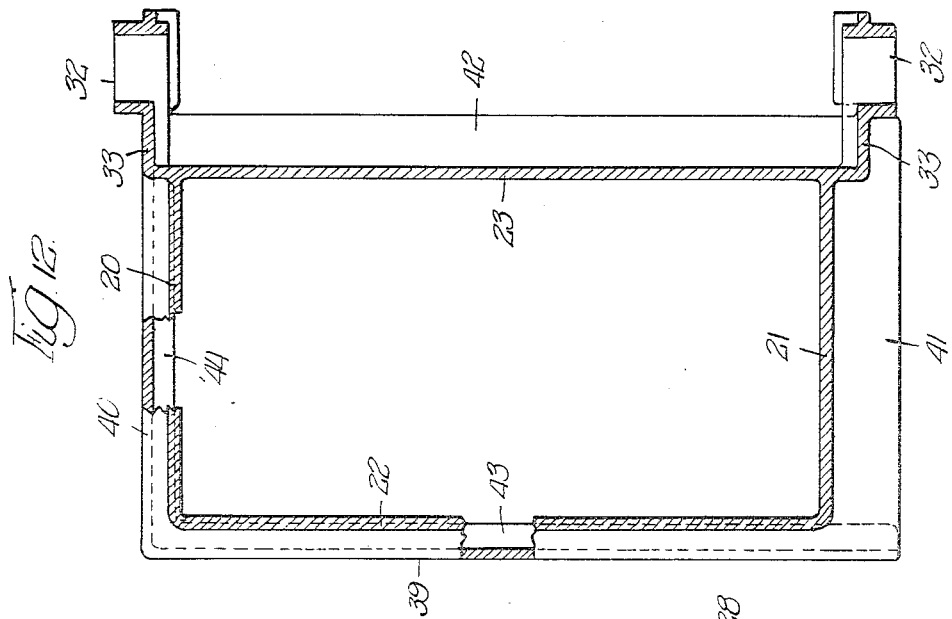
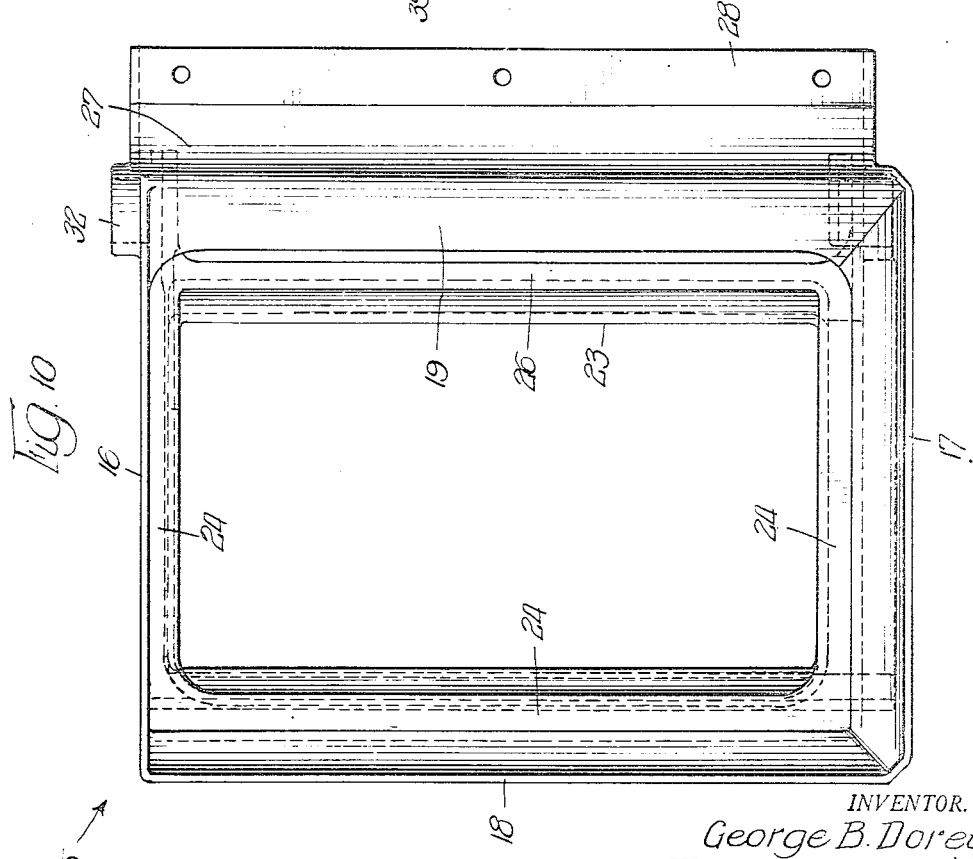
INVENTOR.
George B. Dorey,
BY
Robert R. Lockwood
ATTY

United States Patent Office 2,751,862
Patented June 26, 1956

2,751,862

HOPPER DISCHARGE OUTLET STRUCTURE AND SEALING MEANS THEREFOR

George B. Dorey, Westmount, Quebec, Canada, assignor to Enterprise Railway Equipment Company, Chicago, Ill., a corporation of Illinois Application May 1, 1953, Serial No. 352,530

7 Claims. (Cl. 105—282)

This invention relates to an improved hopper discharge outlet structure for the discharge opening of a load containing hopper and has for one of its main objects the adaptation of the conventional type of outlet to accommodate a supplementary sealing member for preventing moisture from reaching the lading.

The invention is by way of an improvement on the structure shown in the A. Campbell United States Patent No. 2,072,292, of March 3, 1937, wherein a discharge opening is bordered by a frame having a sliding gate therein for controlling discharge of lading and wherein there are provided open sided grooves on two adjacent sides of the opening for receiving a removable extension chute. In the structure shown in said patent one of the grooves extends transversely to the direction of movement of the gate and is located beneath the gate with the open side of the groove facing away from the direction of opening movement of the gate thereby precluding the use of a supplementary member located in the grooves to move with the gate during the opening movement of the latter. It is one of the objects of the present invention to provide an outlet structure having grooves of the character described so located as to accommodate a sealing member to slide in the grooves provided for the reception of a removable extension whereby said grooves will perform the dual function of accommodating the removable chute as well as the supplementary sealing member.

Another object of the invention includes the provision of a supplementary sealing member having a section adapted to lie in the discharge opening and having an extension projecting beyond the opening to enclose the gate and its operating mechanism.

Still another object of the invention is to provide a sealing member which, when in operative sealing position, operates as a locking means for retaining a sliding gate in closed position.

The invention further resides in the specific construction of the sealing member and in the combination of parts and structure of the supporting frame associated with the sealing member for attaining the desired sealing security.

For further comprehension of the invention, reference may be had to the accompanying drawings wherein:

Figure 1 is a side elevational view of a portion of a hopper showing the improved structure applied thereto, said view showing the gate in closed position and the sealing member in operative sealing position;

Figure 2 is a vertical end view of the structure shown in Figure 1 as seen on a line 2—2 of Figure 1;

Figure 4 is a transverse vertical sectional view taken through the outlet assembly as seen on a line 4—4 of Figure 3;

Figure 5 is a longitudinal vertical sectional view of the outlet assembly as seen on a line 5—5 of Figure 3;

Figure 6 is a view, similar to Figure 5, except that the gate and sealing member are shown as positioned when the gate is in open position;

Figure 7 is a perspective view of the sealing member on a reduced scale;

Figure 8 is a detached side elevational view of the frame;

Figure 9 is a vertical end view of the frame shown in Figure 8 as viewed from right to left;

Figure 10 is a plan view of the frame shown in Figures 8 and 9;

Figure 11 is a fractional horizontal sectional view taken on a line 11—11 of Figure 1;

Figure 12 is a horizontal sectional view taken through the frame on a line 12—12 of Figure 8 with parts of the side walls broken away to better illustrate the open sided grooves.

Figure 3:
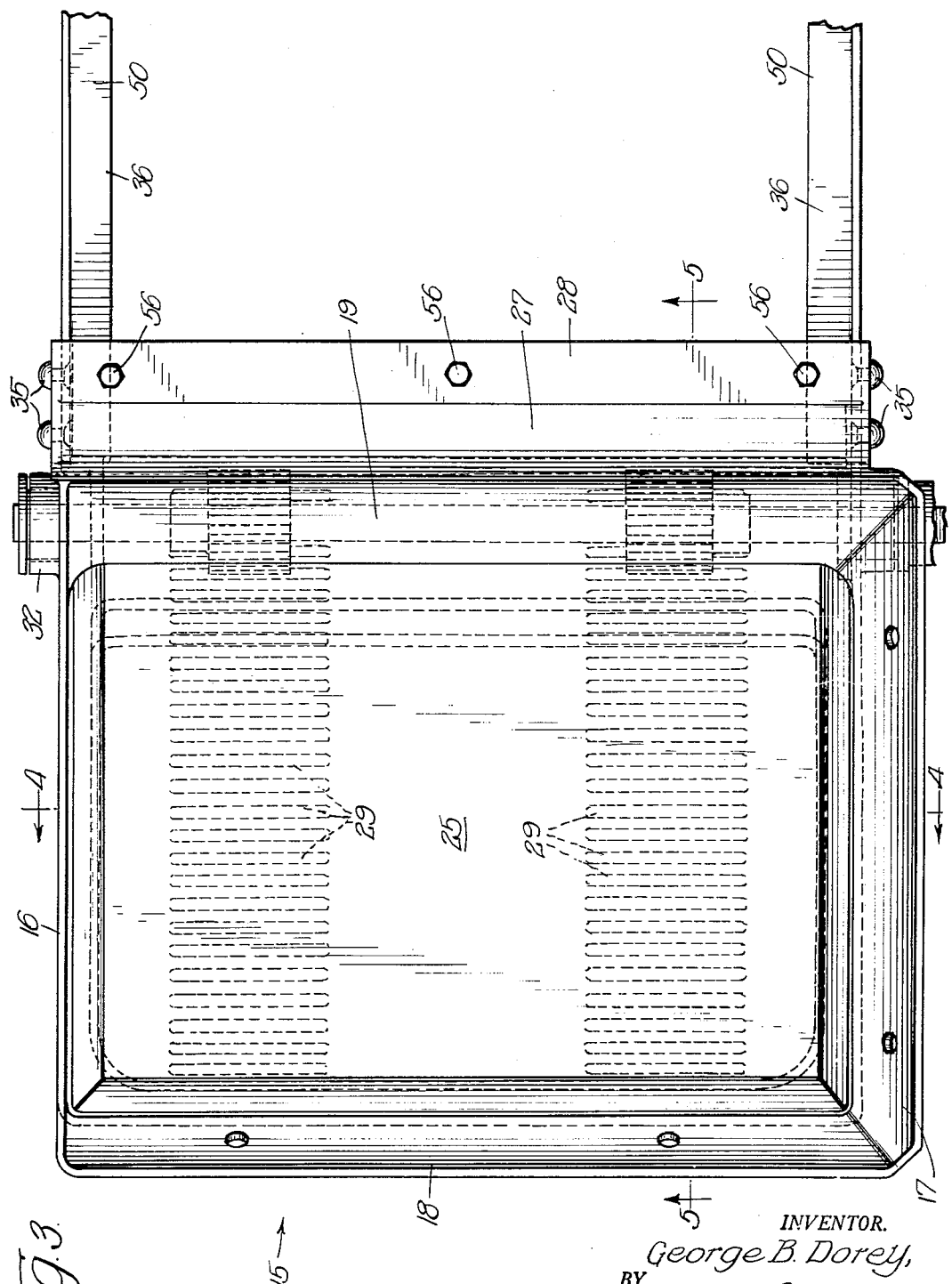
Figure 3 is a plan view of the structure shown in Figure 1.

In said drawings, the improved outlet structure is shown as applied to a load containing hopper including inner and outer side walls as indicated at 10 and 11, respectively, said walls meeting with longitudinally sloping walls 12 and 13 to form a foursided hopper having the inner wall 10 substantially vertically disposed and the walls 11, 12, and 13 sloping downwardly to direct lading to a discharge opening 14.

The opening 14 is surrounded by a frame 15 having an upper portion including walls 16, 17, 18 and 19 which overlie the walls 10, 11, 12, and 13 of the hopper and below the level of the said overlying walls there is disposed a foursided chute like depending structure of appreciable depth formed by walls 20, 21, 22 and 23, the walls 20, 21, and 22 being spaced inwardly from the walls 16, 17 and 18 to present a ledge section 24 to form a support for a sliding gate 25.

The gate 25 is adapted to slide lengthwise on the side portions of the ledge section 24 and it extends, as shown in Figure 5, beyond the fourth side 23 of the chute beneath the overlying wall or flange 19 of the frame 15. The upper margin of the side 23 is formed with a horizontally disposed flange 26 which in combination with the lower margin of the upper overlying wall 19 forms a slotted aperture 23a through which the gate 25 projects. The frame 15 beyond the wall 19 is formed with a hood-like extension including a wall 27 disposed substantially normal to the wall 19 and in combination therewith forms an inverted V-shaped hood. Beyond said wall 27 there is disposed a substantially horizontally extending wall 28 which leads from the lower portion of the wall 27. Said walls 19, 27, and 28 combine to form a protective shield above the forwardly projecting portion of the gate 25.

The gate 25 is moved by the conventional type of rack and pinion mechanism and to this end the underside of the gate is provided with rack teeth 29 and cooperating therewith are pinion gears 30 which in turn are non-rotatably mounted on a rotatable operating shaft 31. The shaft 31 is journalled in bearings 32—32 which are preferably formed integrally with side walls 33 formed on the frame 15. The said side walls 33 extend upwardly above the level of the gate to present wall sections 34—34 which merge into the walls 19, 27 and 28 of the hood. Secured to said wall sections 34 by rivets 35 at one end of the frame 15 are angle shaped runways 36 for supporting the gate 25 in opened position. The runways 36 at the end thereof remote from the frame 15 are supported by the usual framework, the lower part of which is indicated at 36a.

The shaft 31 is rotated by an operating handle 37 which is located outwardly of the frame 15 and carries a series of socket openings 38 for receiving a removable operating bar as will be understood readily.

The lower margin of the chute is reinforced by outwardly laterally extending wall sections as indicated in Figure 12 at 39, 40, 41 and 42. In connection with the adjacent wall sections 39 and 40, there are provided open sided grooves as indicated at 43 and 44, respectively, for receiving a removable extension chute having flanges which fit in these grooves and which bear against the undersides of the remaining two sides 41 and 42 and are adapted to be clamped thereto.

The open side of the groove 43 faces in the general direction of opening movement of the gate 25 for the accommodation of an auxiliary gate or sealing slide member 45 therein. By so disposing the open side of the groove 43 to face in the direction of opening movement of the gate 25, there is provided a clear space for accommodating the auxiliary gate or slide member 45 in the grooves 43 and 44 and the extension of said slide to enclose the shaft 31 and pinion gears 30 in addition to the gate 25 when the latter is in closed position.

The auxiliary gate or sealing slide member 45 is preferably generally of Z-shape, Figure 7, including a main body section 46, an upwardly extending section 47 and a forwardly projecting flange 48. The upwardly extending section 47 is provided on each side with a notch 49 for embracing the horizontally disposed walls 50 of the runways or rail extensions 36, thereby supporting the outer end of the slide member 45. The gate or sealing slide member 45 at the junction of the sections 46 and 47 is preferably curved as at 52 on a contour concentrically related to the axis of the shaft 31 and a beading 53, Figure 6, extends laterally inwardly from the side walls 33 to register with the ends of the curved surface 52 and thereby form a seal to guard against the entrance of foreign matter. Flanges 54 and 55, Figure 2, extend inwardly from the side walls 33 to underlie the body section 46 of the gate or sealing slide member 45 and support the same.

The gate or sealing slide member 45, when in operative sealing position, lies with the two edge portions within the grooves 43 and 44. It underlies the outwardly extending wall section 41 and can be secured thereto by removable clamps (not shown). In this sealing position, the slide member 45 covers the discharge opening 14 and projects beyond the chute to extend beyond the forward end of the gate 25 and enclose the latter as well as the shaft 31 and pinion gears 30. The flange 48 of the sealing slide member 45, when the latter is in the closed position, registers with the wall 28 of the hood of the frame 15 and is secured thereto by bolts 56.

The sealing slide member 45, when bolted in operative position, prevents opening movement of the gate 25. In addition it provides a complete enclosure for the gate 25 and its associated operating gear thereby excluding the entrance of moisture and foreign matter. Therefore, it is unnecessary to provide additional locking means for holding the gate 25 closed. It will be noted by reference to Figure 6 that the sealing slide member 45 is movable in advance of the gate 25 in the opening direction since the leading edge of the gate 25 engages the inner side of the section 47 as shown in Figure 6. The sealing slide member 45 can be moved in advance of the gate 25 to the position shown in Figure 6. During such movement it is supported by the inwardly extending flanges 54 and 55 and by the rail extensions 36 through the medium of the notches 49. After the gate 25 is closed, the auxiliary gate or sealing slide member 45 is returned separately to the sealing position shown in Figure 5. If desired, the leading edge portion of the gate 25 can be attached to the section 47 of the sealing slide member 45 so that the latter will be returned to the sealing position along with the gate 25.

What is claimed as new is:

1. In a load containing hopper having a discharge opening through which lading can flow by gravity, a sliding gate for contacting said lading and closing said opening, a frame around said discharge opening and slidably supporting said gate and providing therewith a lading tight closure for said discharge opening, an auxiliary gate slidably mounted on said frame underneath said gate to slide parallel thereto and when closed protecting the underside of said gate from contamination by extraneous material, and means operatively interconnecting said gates whereby the same are moved conjointly.

2. In a load containing hopper having a discharge opening through which lading can flow by gravity, a sliding gate for contacting said lading and closing said opening, a frame around said discharge opening and slidably supporting said gate and providing therewith a lading tight closure for said discharge opening, and a sealing slide underneath said gate slidably mounted on said frame, said frame below the gate having a foursided discharge chute of appreciable depth defining the final discharge opening, said chute having walls around the lower portion thereof and presenting an abutting face against which a removable extension chute is adapted to be positioned, said walls on two adjacent sides of the chute having inwardly extending open sided grooves for receiving and holding the chute extension, one of said grooves extending transversely to the direction of movement of the gate and having the open side thereof facing in the direction of opening movement of the gate whereby said sealing slide can be accommodated in said grooves and move therefrom in advance of opening movement of said gate, said sealing slide in closed position protecting the underside of said gate from contamination by extraneous material.

3. In a load containing hopper having a discharge opening through which lading can flow by gravity and a sliding gate for contacting said lading and closing said opening, a frame bordering said opening and forming a sliding support for said gate, said frame having a foursided chute like portion below the gate defining the final discharge outlet and bracket portions extending lengthwise beyond the chute, a shaft journaled in said bracket portions and interengaging rack teeth and pinion means on the gate and shaft respectively for moving the gate by rotation of the shaft, and extension rail members of angle shape secured to said bracket portions, said rail members each including a flange extending upwardly above the gate and secured to the related bracket portion and having the adjacent flange extending inwardly beneath the gate to support the same in the open position; the herein described shielding means for excluding entrance of moisture and foreign matter between the frame and gate comprising a shield slidably mounted on said frame and adapted to be positioned in the final discharge outlet opening, said shield being formed with an upwardly extending section for enclosing said shaft, pinion gears and gate for protecting the underside of said gate from contamination by extraneous material, said shield extending below said opening for sealing the final discharge outlet when in closed position.

4. In a load containing hopper having a discharge opening through which lading can flow by gravity and a sliding gate for contacting said lading and closing said opening, a frame bordering the discharge opening and forming a sliding support for said gate, said frame having a foursided chute like structure below the gate defining the final discharge outlet and including side extensions beyond the chute, an operating shaft for the gate journaled in said extensions, interengaging geared rack and pinion means carried by said gate and shaft respectively for moving the former by rotation of the latter, angle shaped members secured to said side extensions and forming ways for supporting said gate in the open position, each angle shaped member having one flange underlying the gate and the adjacent flange extending upwardly and secured to the extensions, a hood like structure extending transversely beyond the frame and formed with a forwardly projecting wall extending in the general direction of the gate, a shielding member of generally Z shape having a flange adapted to be detachably secured to the forwardly projecting flange of the hood and extend downwardly therefrom with another portion underlying said frame and enclosing said gate and said operating shaft and lying beneath said chute to seal the final discharge opening when the gate is in closed position to prevent contamination of the underside thereof by extraneous material, and means for securing said flange of said shielding member to said wall of said hood and thereby preventing opening movement of said gate until said securing means is released.

5. The invention, as set forth in claim 4, wherein the downwardly extending portion of the shield is provided with side openings for embracing the supporting flanges of the side angle members.

6. In a load containing hopper having a discharge opening through which lading can flow by gravity and a sliding gate for contacting said lading and closing the opening, a frame bordering the opening and forming a sliding support for said gate, said frame having a four-sided chute like portion below the gate defining the final discharge outlet and bracket portions at each side of the gate projecting forwardly beyond the chute, an operating shaft for the gate journaled in said bracket portions, interengaging rack and pinion means on the gate and shaft respectively for moving the gate by rotation of the shaft, angle shaped extension ways secured to said bracket portions for supporting said gate in the open position, said angle shaped ways being disposed above the shaft, a shielding member having a main body portion positioned below the chute to seal the final discharge opening when the gate is in closed position, said sealing member having an end wall section extending upwardly from the main body portion to enclose the shaft, pinion means and gate for protecting the underside thereof from contamination by extraneous material, and flanges extending laterally inwardly from the lower portion of said chute to underlie and support the main body portion of the shielding member.

7. The invention, as set forth in claim 6, wherein the end wall section of the sealing member is provided with slots straddling the supporting extension ways for the gate.

References Cited in the file of this patent

UNITED STATES PATENTS

| | | |
|---|---|---|
| 669,876 | Critchlow | Mar. 12, 1901 |
| 1,115,365 | Wright | Oct. 27, 1914 |
| 1,659,065 | Weigand | Feb. 14, 1928 |
| 2,142,236 | Campbell | Jan. 3, 1939 |
| 2,222,280 | Batho | Nov. 19, 1940 |